United States Patent

Miller

[11] 3,734,200
[45] May 22, 1973

[54] HITCH ARRANGEMENT FOR FRONT MOUNTED AGRICULTURAL IMPLEMENT

[76] Inventor: Russell A. Miller, R.R. 2, Mendon, Ill. 62351

[22] Filed: June 25, 1971

[21] Appl. No.: 156,677

[52] U.S. Cl. .................. 172/298, 172/463, 172/679
[51] Int. Cl. .................... A01b 59/046, A01b 63/106
[58] Field of Search ................... 172/452, 298, 311, 172/413, 312, 456, 457, 463, 668, 488, 677, 691

[56] References Cited

UNITED STATES PATENTS

| 3,088,526 | 5/1963 | Swenson | 172/298 X |
| 2,876,564 | 3/1959 | Briscoe | 172/463 X |
| 2,555,549 | 6/1951 | Kreigbaum | 172/298 |
| 2,833,197 | 5/1958 | Oehler et al. | 172/298 |
| 904,864 | 11/1908 | Glick et al. | 172/679 |

Primary Examiner—Robert E. Pulfrey
Assistant Examiner—Stephen C. Pellegrino
Attorney—Michael E. Martin

[57] ABSTRACT

A front mounted hitch arrangement for a row crop tractor having a pair of outrigger frames pivotally mounted to be swung about a vertical axis from a working position to an over the road transport position. Pull type planter units are hitched to each outrigger frame by a pin and slot type hitch which provides for correct positioning of the planter units for planting and also for over the road movement. Roller type guides between the planters and frames prevent lateral sway while permitting vertical movement of the planters while traversing uneven terrain. A hydraulic cylinder and cable arrangement raises the planters off the ground to be supported by the outrigger frames during over the road transport.

5 Claims, 4 Drawing Figures

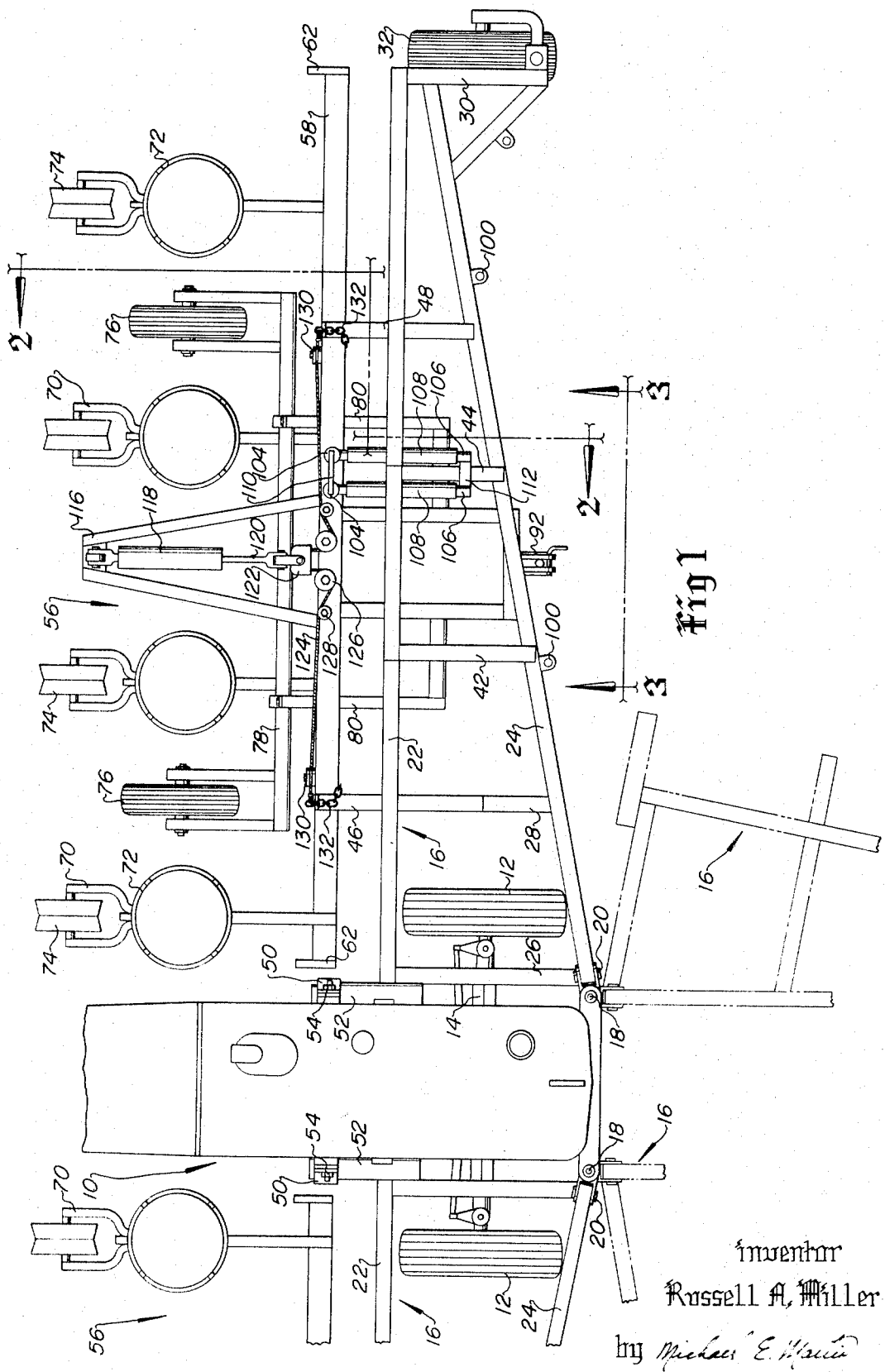

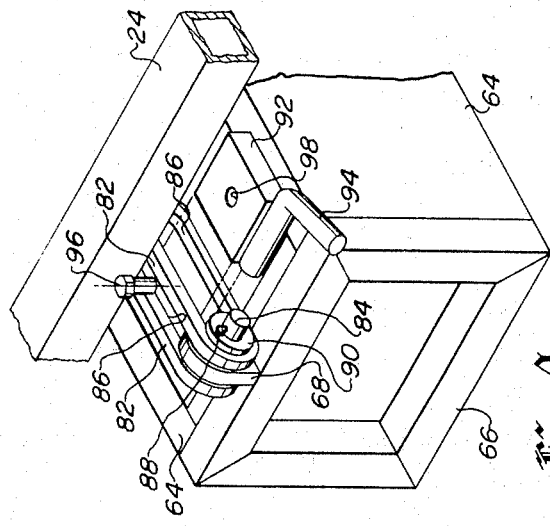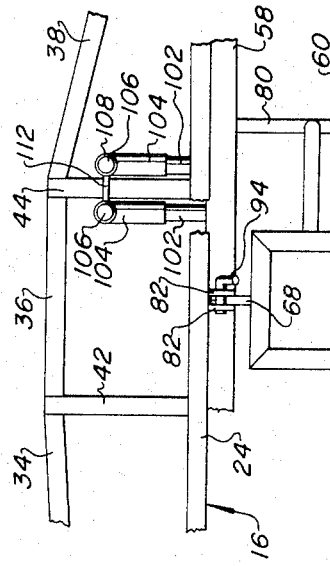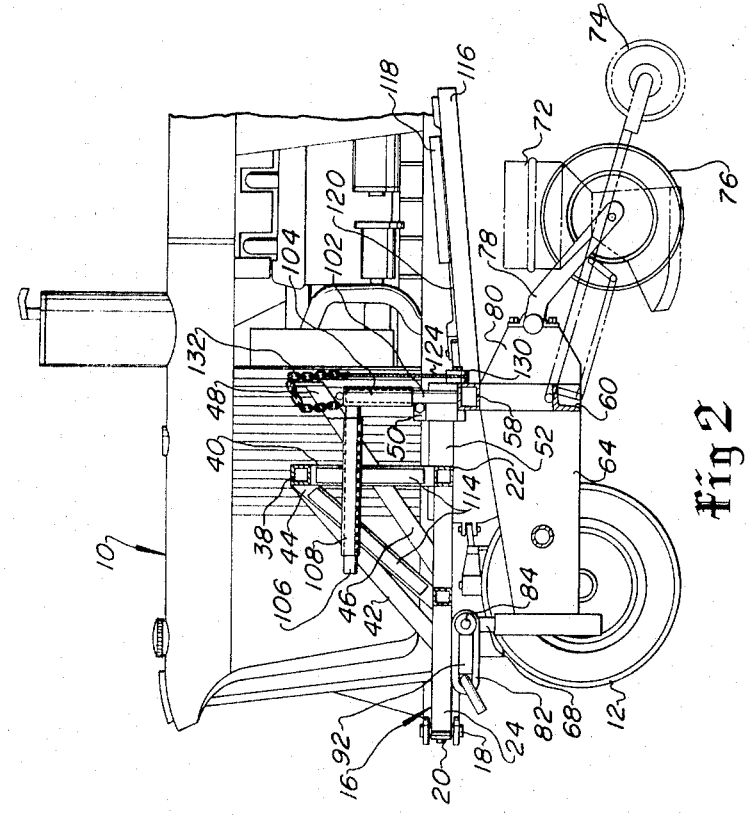

HITCH ARRANGEMENT FOR FRONT MOUNTED AGRICULTURAL IMPLEMENT

BACKGROUND OF THE INVENTION

Ground working implement arrangements are known wherein outrigger frames are provided which are pivotally attached to the front end of a tractor. These outrigger frames are operable to have implements such as cultivators and the like mounted thereon and they may be pivoted forward about a vertical pivot connection with the tractor proper to a folded position. The folded position makes possible movement of the tractor and implements through gate openings and over the road transport wihtout disassembly or unhitching of the implements. However, conventional pull type implements such as corn planters and the like have heretofore not been readily adaptable to being used with front mounted outrigger frame arrangements. Accordingly such conventional implements have not been used to the advantages of increased mobility and substantial ground coverage per field traversal such as generally experienced with front end frame mounted implement arrangements.

For example prior to the present invention pull type corn planters and the like have not been towed by front mounted outrigger frame arrangements because a suitable working position behind the tractor front wheels does not provide for the minimum width of the frames and implements in the forward folded position necessary for passing through standard gate openings. Furthermore excessive vehicle width during over the road transport is dangerous and usually unlawful.

A related problem associated with towing pull type implements with tractor mounted outrigger frames involves the prevention of lateral sway or yawing of the implement while yet allowing for vertical movement of the implement with respect to the outrigger frame when traversing uneven ground. Accurate and true tracking of planters and cultivators is neccessary for planting evenly spaced rows and to prevent plowing up the plants being cultivated.

SUMMARY OF THE INVENTION

The present invention provides an improved front mounted hitch arrangement for row crop tractors for towing an implement such as a planter unit or the like behind a pivoted outrigger frame mounted on each side of the front of the tractor proper. With the hitch arrangement according to the present invention conventional pull type wheel mounted planter units and the like may be advantageously operated from a planting position directly behind a pair of outrigger frames pivotally mounted on each side of the front end of a row crop tractor.

The hitch arrangement according to the present invention provides for a single point hitch connection between the implement and the outrigger frame which may be adjusted for moving the implement relative to the outrigger frame to provide proper relative clearance in the working position and to reduce overall width of the tractor-implement arrangement in the over the road transport position. The hitch arrangement of the present invention provides a pin and slot type connection which eliminates the need for supporting the tongue weight of the implement when the relative position of the implement with respect to the outrigger frame is being changed.

The present invention also provides in a front mounted hitch arrangement for pull type row crop implements means for substantially eliminating lateral sway or yawing of the implement with respect to the towing frame. The lateral sway controlling means also however provides for vertical movement of the implement with respect to an outrigger towing frame to thereby provide for proper ground working on hilly or uneven terrain.

In accordance with the present invention there is provided a hitch arrangement for pull type wheel mounted implements which makes such types of implements advantageously useful with foldable front mounted frames on row crop tractors. The front end mounted type hitch arrangement of the present invention not only provides for greater ground coverage with pull type implements but also increases the mobility of the tractor-implement assembly for more effective crop production.

BRIEF DESCRIPTION OF THE DRAWINGS

FIG. 1 is a plan view of one side of the front end hitch arrangement showing an outrigger frame with a planter unit attached.

FIG. 2 is an elevation taken substantially along the line 2—2 of FIG. 1.

FIG. 3 is a view taken along line 3—3 of FIG. 1.

FIG. 4 is an exploded perspective view of the sliding hitch connection between the implement and the outrigger frame.

DESCRIPTION OF THE PREFERRED EMBODIMENTS

Referring to FIGS. 1 and 2 the present invention is shown in connection with a conventional row crop tractor partially shown and represented by the numeral 10. The tractor 10 includes spaced apart front wheels 12 mounted on a horizontal axle support 14. The present invention may also be used on tractors having the close together front wheel or so called "tricycle" wheel configuration. The tractor 10 is equipped with a pair of elongated outrigger frames 16, one shown in full, pivotally mounted to the tractor proper about substantially vertical pivots 18. The pivot connection between the tractor 10 and the outrigger frame 16 includes a second pivot 20 perpendicular to the pivots 18 forming a universal joint type of connection between the frames and the tractor.

The outrigger frames 16 are fabricated of tubular metal and include elongated spars 22 and 24. The spars 22 and 24 are interconnected by longitudinal ribs 26, 28 and 30. Although the present invention contemplates an arrangement including two outrigger frames 16 mounted on opposite sides forwardly on a row crop tractor, only one frame is shown in full in the accompanying drawings and the structure will be referred to hereafter in the singular sense. The outermost rib 30 from the tractor 10 is adapted to mount a swivelled caster wheel 32 which engages the ground and supports the outer end of the frame 16. Referring to FIG. 3 also, the frame 16 includes a truss made up of members 34, 36 and 38 mounted above the spar 22 and supported by two vertical members 40, one shown in FIG. 2, and inclined members 42 and 44. The frame 16 further includes inclined members 46 and 48 for supporting an implement in an over the road transport position in a manner to be explained herein. The outrigger frame 16 is also secured to the tractor 10 in the transverse working position represented by the solid lines of FIG. 1, by a hinged clamp 50 which journals a cylindrical tubular member 52 forming a part of the frame. The hinged clamp 50 is secured by a bolt 54 to the tractor proper.

The outrigger frame 16 is designed to comprise a transport device and means for hitching a pull type ground working implement such as the corn or grain planter generally designated by the numeral 56. The planter 56 is characterized by a frame made up of elongated structural members 58 and 60. The planter frame members 58 and 60 are interconnected by end supports 62 and also by spaced parallel plates 64 forming a tongue for towing the planter. A rectangular frame portion 66 attached to the distal end of the plates 64 includes an integral upstanding tab 68 which comprises hitch means for connecting the planter 56 to the outrigger frame 16, see FIG. 4. The planter 56 includes a plurality of individual planter units 70 attached to the planter frame. The planter units 70 are of a type generally well known in the art and include the conventional seed hoppers 72 and press wheels 74 as shown in FIG. 1. The planter 56 is supported by an undercarriage comprising the ground engaging wheels 76 and an axle support assembly 78. The axle support assembly 78 is attached to planter frame members 80.

The outrigger frame 16 pulls the planter 56 in the working position by means of a single point hitch comprising in addition to the integral tab 68, a pair of spaced parallel brackets 82 fixed to the outrigger frame. As shown in FIGS. 2, 3, and 4 the tab 68 fits between the spaced brackets 82 and is secured thereto by a transverse pin 84 located in elongated slots 86 in the brackets and passing through a suitable hole, not shown, in the tab. The pin 84 is retained in place by suitable keys 88, one shown, and washers 90, also one shown. Also fitted into the slots 86 in the brackets is a removable position block 92 having a handle portion 94. In the position shown in FIGS. 1, 2, and 3 the block 92 is positioned forward of the pin 84, with respect to the fore and aft direction of the tractor 10. The position shown in FIGS. 1, 2, and 3 is the first or working position for the planter 56 and provides sufficient clearance between the planter and tractor wheel 12 as well as between the planter and the outrigger frame 16. This first position does not however provide for the necessary reduced width of the outrigger frame and implement assembly for passing through fence gate openings or for traversing roadways when the outrigger frames are folded into the transport position.

The pin 84 and tab 68 may be moved to a second position shown in the exploded view of FIG. 4 by removing the block 92 from the slots 86 and moving the planter 56 with respect to the frame 16 forwardly such as for example by moving the tractor 10 in reverse. The block 92 may then be replaced in the slots 86 behind the pin 84 to hold the planter in position. The block 92 is held in place in the brackets 82 by a pin 96 having a hexagon shaped head and removably insertable in the hole 98 in the block. The second position shown in FIG. 4 provides for the planter 56 to be closer to the frame 16 wherein the width of the frame and planter assemblies is reduced in the over the road transport position of the outrigger frame 16. The transport position of the frames 16 is shown by the dashed lines of FIG. 1. The transport position is achieved by removing the bolt 54 holding the hinged bracket 50 and operating the tractor in reverse to pivot the frames about the pivot axis 18 until they are both in the position shown by the dashed lines of FIG. 1. The outrigger frames are fastened together by suitable connecting links, not shown, fitted in openings 100 to facilitate transport movement. The sliding pin and slot hitch arrangement shown also eliminates complete disconnection of the planter with respect to the frame which, due to substantial implement tongue weight, usually makes reconnection difficult.

The planter 56 is also provided with guiding and stabilizing means to provide for substantially preventing sway or yawing movement of the planter in the horizontal direction with respect to the frame 16. This prevention of swaying movement is necessary for planting straight rows and to provide true radial tracking or the planters when the tractor 10 is turning. The aforementioned stabilizing means comprises a pair of spaced upstanding cylindrical posts 102 attached to the planter frame member 58. Fitted over the posts 102 in telescoping relationship are tubular member 104 closed at their upper ends. The tubular members 104 each have elongated shafts 106 attached thereto adjacent their upper ends and projecting forwardly at right angles to the longitudinal axis of the tubular members. Rotatably mounted on the spaced shafts 106 are guide members comprising rollers 108 which are parallel and are positioned closely spaced on opposite sides of and engageable with the outrigger frame members 40 and 44. The guide roller and shaft arrangement includes integral brackets 110 and 112 holding the shafts 106 and tubular members 104 together in a unitary assembly. The brackets 110 and 112 are preferably welded to the tubular members and shafts, respectively, in assembly on the outrigger frame 16. The aforementioned stabilizing means provides for vertical movement of the planter 56 with respect to the outrigger frame about a horizontal pivot axis formed by the hitch pin 84. However, said stabilizing means substantially prevents the planter from swaying horizontally with respect to the frame 16 and also reduces lateral forces acting on the hitch tab 68 and brackets 82. The frame members 40 and 44 are provided with wear strips 114 to take the forcible engagement with the rollers 108.

Referring to FIGS. 1 and 2 the planter 56 further includes a support 116 for double acting hydraulic cylinder 118 having a piston rod 120 to which is attached a wire rope block assembly 122. The opposite end of the cylinder 118 is attached to the support 116. A wire rope 124, reaved through the block 122, leads in opposite directions over pairs of sheaves 126, 128, and 130 attached to the planter frame member 58. The ends of the wire rope 124 are connected to lengths of link chain 132 which are suitably attached to the ends of the inclined frame members 46 and 48. The hydraulic cylinder 118 is suitably connected to a conventional hydraulic pump and control valve system on the tractor proper and is actuatable to retract the piston rod 120 into the cylinder from the position shown in FIG. 1 to raise the planter off the ground wherein the planter is substantially supported by the frame 16. This action is taken when it is desired to transport the planter 56 over the road with the outrigger frames 16 in the position shown by the dashed lines of FIG. 1. The planter 56 is also desirably raised when undergoing very sharp turns with the frame 16 in the working position to prevent damaging sideways skidding of the planter units 70.

Although the features of the present invention are disclosed in use on a planter implement it is contemplated that other pull type ground working implements may be adapted to utilize the hitch arrangement disclosed herein.

What is claimed is:

1. In a hitch arrangement for agricultural implements:

a tractor;

an elongated frame pivotally connected at one end to said tractor forwardly on said tractor; said elongated frame being operable to be pivoted with respect to said tractor about a substantially vertical pivot axis from a transverse working position to a folded transport position;

a pull type ground working implement including a frame; and, hitch means for connecting said implement to said elongated frame to be drawn thereby and providing for pivotal movement of said implement with respect to said elongated frame about a substantially horizontal pivot axis, said hitch means comprising a pair of spaced parallel brackets on one of said frames, said brackets including elongated slots therein, a tab on the other of said frames adapted to fit between said brackets, and pin means connected to said tab and projecting into said slots in said brackets, said hitch means being operable to provide for moving said implement from a first position with respect to said elongated frame when said elongated frame is in said working position to a second position with respect to said elongated frame when said elongated frame is in said transport position without disconnecting said implement from said elongated frame, and said hitch means includes a position block removably insertable in said slots in said brackets for holding said implement in said first and second positions with respect to said elongated frame.

2. The invention set forth in Claim 1 together with: means operable to raise said implement from a ground engaging position to a position whereby said implement is supported substantially by said elongated frame, said means including a fluid operated cylinder and piston mounted on said implement, flexible cable means connected to said elongated frame and said fluid operated cylinder and engaged with said implement whereby in response to the actuation of said cylinder said implement is operable to be raised to a position whereby said implement is substantially supported by said elongated frame.

3. In a hitch arrangement for agricultural implements:

a tractor;

an elongated frame pivotally connected at one end to said tractor forwardly on said tractor; said elongated frame being operable to be pivoted with respect to said tractor about a substantially vertical pivot axis from a transverse working position to a folded transport position;

a pull type ground working implement including a frame;

hitch means for connecting said implement to said elongated frame to be drawn thereby and providing for pivotal movement of said implement with respect to said elongated frame about a substantially horizontal pivot axis, said hitch means being operable to provide for moving said implement from a first position with respect to said elongated frame when said elongated frame is in said working position to a second position with respect to said elongated frame when said elongated frame is in said transport position without disconnecting said implement from said elongated frame; and, implement stabilizing means operable to provide for vertical movement of said implement with respect to said elongated frame about said horizontal pivot axis, said stabilizing means comprising a pair of spaced upstanding posts mounted on said frame, tubular members telescopically slidable over said posts, said tubular members each including a guide member attached thereto and spaced parallel one guide member to the other, and said elongated frame includes a member interposed between said guide members and engageable by said guide members to provide for substantially preventing swaying movement of said implement in a horizontal direction with respect to said elongated frame.

4. The invention set forth in claim 3 wherein: said spaced parallel guide members comprise rollers rotatably mounted on shaft means attached to said tubular members.

5. In a hitch arrangement for agricultural implements:

a tractor;

an elongated frame pivotally connected at one end to said tractor forwardly on said tractor; said elongated frame being operable to be pivoted with respect to said tractor about a substantially vertical pivot axis from a transverse working position to a folded transport position;

a pull type ground working implement including a frame; and, hitch means for connecting said implement to said elongated frame to be drawn thereby and providing for pivotal movement of said implement with respect to said elongated frame about a substantially horizontal pivot axis, said hitch means comprising a pair of spaced parallel brackets on one of said frame, said brackets including elongated slots therein, means on the other of said frames adapted to be positioned adjacent said brackets, and pin means connected to said means and projecting into said slots in said brackets, said hitch means being operable to provide for moving said implement from a first position with respect to said elongated frame when said elongated frame is in said working position to a second position with respect to said elongated frame when said elongated frame is in said transport position without disconnecting said implement from said elongated frame, and said hitch means includes means for holding said implement in said first and second positions with respect to said elongated frame.

* * * * *